(12) United States Patent
Fan

(10) Patent No.: US 7,497,453 B2
(45) Date of Patent: Mar. 3, 2009

(54) RECIPROCAL UPWARD AND DOWNWARD PEDALING BICYCLE STRUCTURE

(75) Inventor: Jeeng-Neng Fan, Taoyuan (TW)

(73) Assignee: Hsin Lung Accessories Co., Ltd., Hsin Chu Hsien (TW)

( * ) Notice: Subject to any disclaimer, the term of this patent is extended or adjusted under 35 U.S.C. 154(b) by 171 days.

(21) Appl. No.: 11/510,624

(22) Filed: Aug. 28, 2006

(65) Prior Publication Data

US 2008/0023933 A1    Jan. 31, 2008

(30) Foreign Application Priority Data

Jul. 4, 2006    (TW) ............................... 95211698 U

(51) Int. Cl.
*B62M 1/04* (2006.01)
(52) U.S. Cl. ................. 280/252; 280/251; 280/253; 280/258
(58) Field of Classification Search ............. 280/252, 280/251, 253, 258
See application file for complete search history.

(56) References Cited

U.S. PATENT DOCUMENTS

| | | | | |
|---|---|---|---|---|
| 2,251,005 | A * | 7/1941 | Rubinich | 280/258 |
| 3,659,871 | A * | 5/1972 | Hott | 280/221 |
| 4,152,951 | A * | 5/1979 | Korczykowski | 74/473.12 |
| 4,798,395 | A * | 1/1989 | Shaffer et al. | 280/240 |
| 5,527,246 | A * | 6/1996 | Rodgers, Jr. | 482/57 |
| 5,607,171 | A * | 3/1997 | Labranche | 280/288.1 |
| 5,979,922 | A * | 11/1999 | Becker et al. | 280/252 |
| 6,010,433 | A * | 1/2000 | Chao | 482/57 |
| 6,173,981 | B1 * | 1/2001 | Coleman | 280/253 |
| 6,398,244 | B1 * | 6/2002 | Chueh | 280/221 |
| 6,402,173 | B1 * | 6/2002 | Chiu | 280/252 |
| 6,554,309 | B2 * | 4/2003 | Thir | 280/253 |
| 6,572,128 | B2 * | 6/2003 | Graf | 280/221 |
| 6,588,784 | B1 * | 7/2003 | Chen | 280/221 |
| 6,659,486 | B2 * | 12/2003 | Eschenbach | 280/221 |
| 6,857,648 | B2 * | 2/2005 | Mehmet | 280/217 |
| 7,048,289 | B2 * | 5/2006 | Lau | 280/252 |
| 7,083,549 | B1 * | 8/2006 | Fan | 482/52 |
| 7,140,626 | B1 * | 11/2006 | Keay | 280/230 |
| 7,341,267 | B2 * | 3/2008 | Vroom | 280/250 |
| 7,377,532 | B2 * | 5/2008 | Bauce | 280/221 |
| 2006/0066072 | A1 * | 3/2006 | Scarborough | 280/253 |
| 2006/0103105 | A1 * | 5/2006 | Fan | 280/221 |
| 2006/0249925 | A1 * | 11/2006 | Yan | 280/252 |
| 2007/0228687 | A1 * | 10/2007 | Parker | 280/252 |

* cited by examiner

*Primary Examiner*—Paul N. Dickson
*Assistant Examiner*—Patrick Centolanzi
(74) *Attorney, Agent, or Firm*—Rosenberg, Klein & Lee

(57) ABSTRACT

A reciprocal upward and downward pedaling bicycle structure includes a main shaft of a free wheel at a chain wheel shaft, a driving body pivotally coupled to a frame of the main shaft, a pedal crank and a support rod on the driving body, and a driving belt linked to the main shaft and the support rod. An end of the driving belt is dragged to the frame by a resilient element. By the action of the resilient element ands the rotation of the main shaft, the crank and pedal are pulled by the driving belt to provide an upward bounce and the chain wheel drives the rear wheel shaft through the main driving belt. When the pedal is stepped downward, the main shaft and the chain wheel are rotated synchronously to drive the rear wheel of the bicycle to move forward.

3 Claims, 6 Drawing Sheets

RECIPROCAL UPWARD AND DOWNWARD PEDALING BICYCLE STRUCTURE

BACKGROUND OF THE INVENTION

1. Field of the Invention

The present invention relates to a reciprocal upward and downward pedaling bicycle structure, and more particularly to a reciprocal upward and downward pedaling bicycle structure that is a simple, easy and convenient structure capable of providing recreating and interesting effects for expected exercises, leisure and transportations in a very different way from the operations of a prior art.

2. Description of the Related Art

In general, a traditional pedal driving method of a bicycle mainly installs a chain wheel and left and right cranks at the positions of a bottom bracket, wherein a pedal is installed at the ends of the left and right cranks, and two pedals are installed with an included angle of 180 degrees, such that a user can step on the pedals alternately for a circular motion. During the rotation of the chain wheel, a rear wheel shaft of a free wheel drives a rear wheel to rotate and move forward. In other words, the traditional way of pedaling and driving a prior art bicycle can be achieved by a circular pedaling performed by both legs of a user. Such pedaling and driving method provides a very good efficiency for a bicycle ride and becomes a common usage for users. To achieve the efficiency and comfortability of a ride, the driving method also needs to go with a saddle for the rider to sit, or else the rider will become exhausted, uncomfortable, inefficient or non-ergonomic easily while performing the circular pedaling motions by both legs for a long time. Furthermore, when the bicycle is operated for short-distance transportations, leisure activities and exercise purposes, such monotonous method of driving a bicycle by performing circular motions by both legs is boring and unable to effectively improve users' curiosity or exercise effect.

In view of the foregoing shortcomings of the prior art, the inventor of the present invention based on years of experience in the related field to conduct extensive researches and experiments, and finally invented a reciprocal upward and downward pedaling bicycle structure in accordance with the present invention.

SUMMARY OF THE INVENTION

The primary objective of the present invention is to overcome the shortcomings of the prior art by providing a reciprocal upward and downward pedaling bicycle structure, wherein the chain wheel shaft has installed at least one main shaft of a free wheel, at least one free rotating driving body pivotally coupled at the position of a frame of the main shaft of the free wheel, a pedal crank and a support rod on the driving body, and a driving belt connected between the main shaft of the free wheel and the driving body. Another end of the driving belt is dragged to the frame by a resilient element, so that the crank and pedal installed at the driving body can provide an upward bounce anytime. If the pedal is stepped downward, the driving belt will drive the main shaft of the free wheel, and a chain wheel coaxial with the main shaft of the free wheel will rotate synchronously, and the main driving belt will drive the rear wheel shaft of the free wheel and the rear wheel to rotate, so that a user can reciprocally step the pedal up and down to directly drive the bicycle forward and provide the operation of a bicycle for leisure and exercise purposes. The present invention is novel, fun and more recreational over the traditional circumferential pedaling method and also provides a better exercising effect.

To make it easy for our examiner to understand the objectives, characteristics and effects of the present invention, a preferred embodiment together with the attached drawings will be described.

DETAILED DESCRIPTION OF THE PREFERRED EMBODIMENTS

The above and other objects, features and advantages of the present invention will become apparent from the following detailed description taken with the accompanying drawings.

Figure 1:
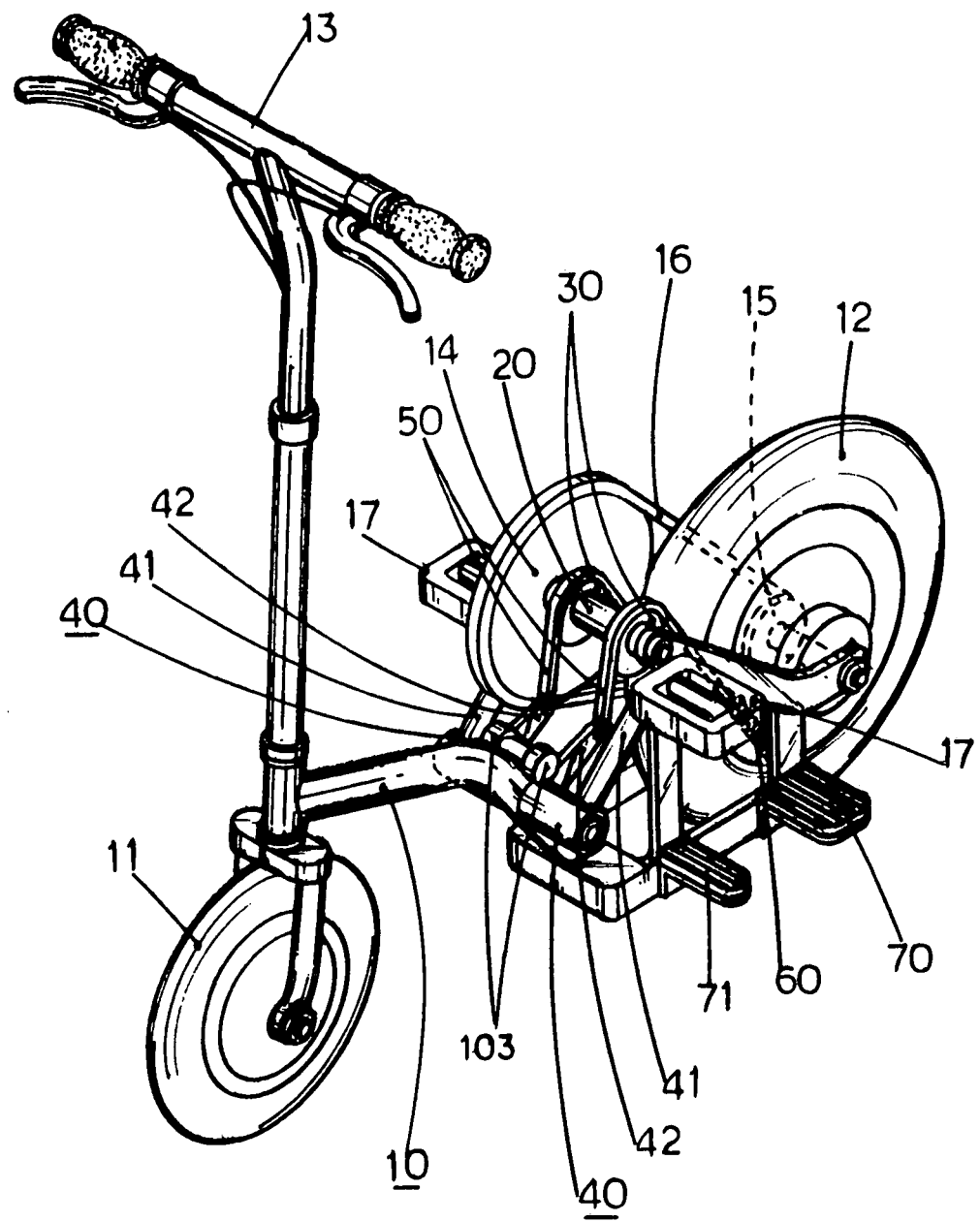
FIG. 1 is a perspective view of a preferred embodiment of the present invention.
Figure 2:
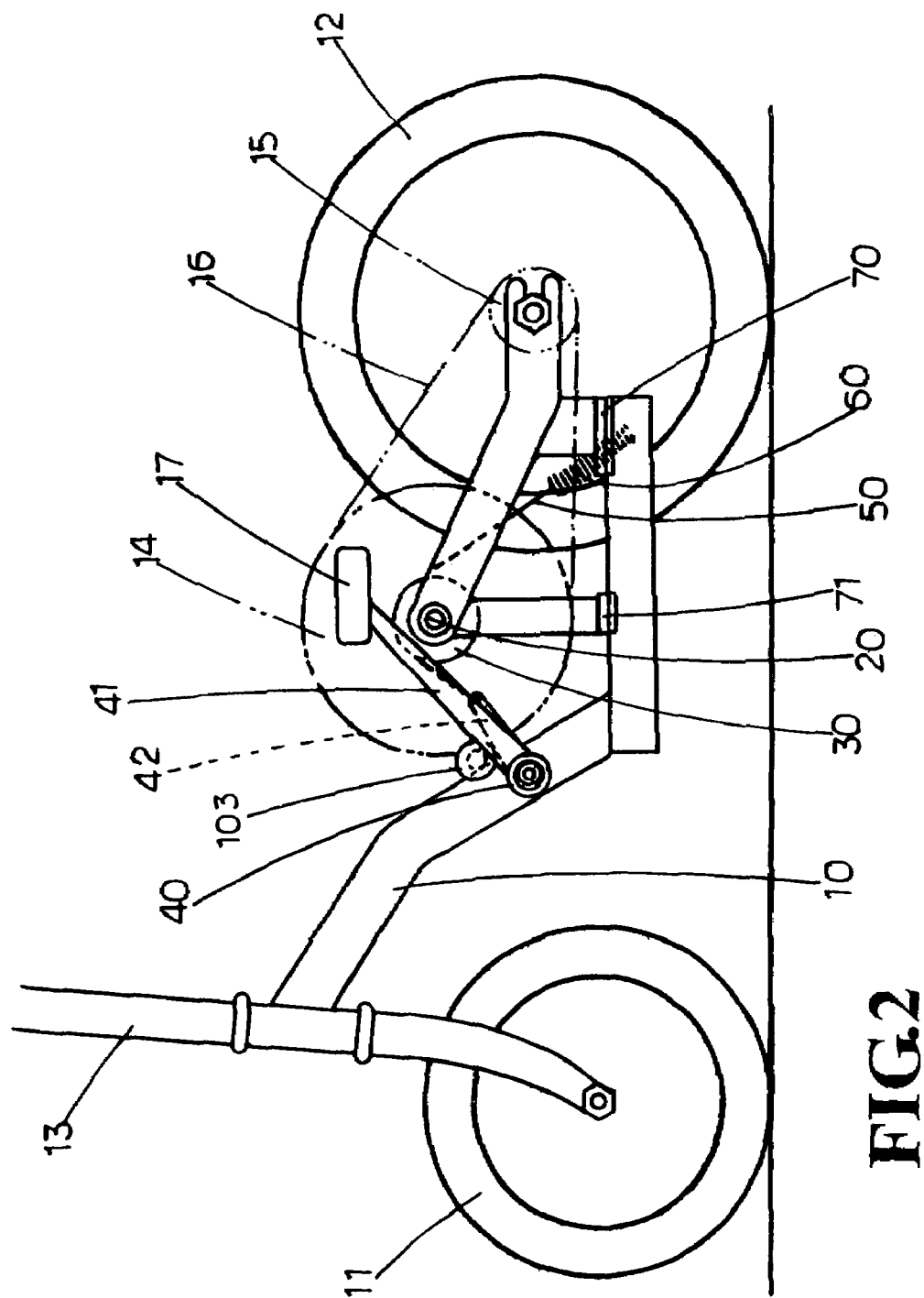
FIG. 2 is a front view of FIG. 1.
Figure 3:
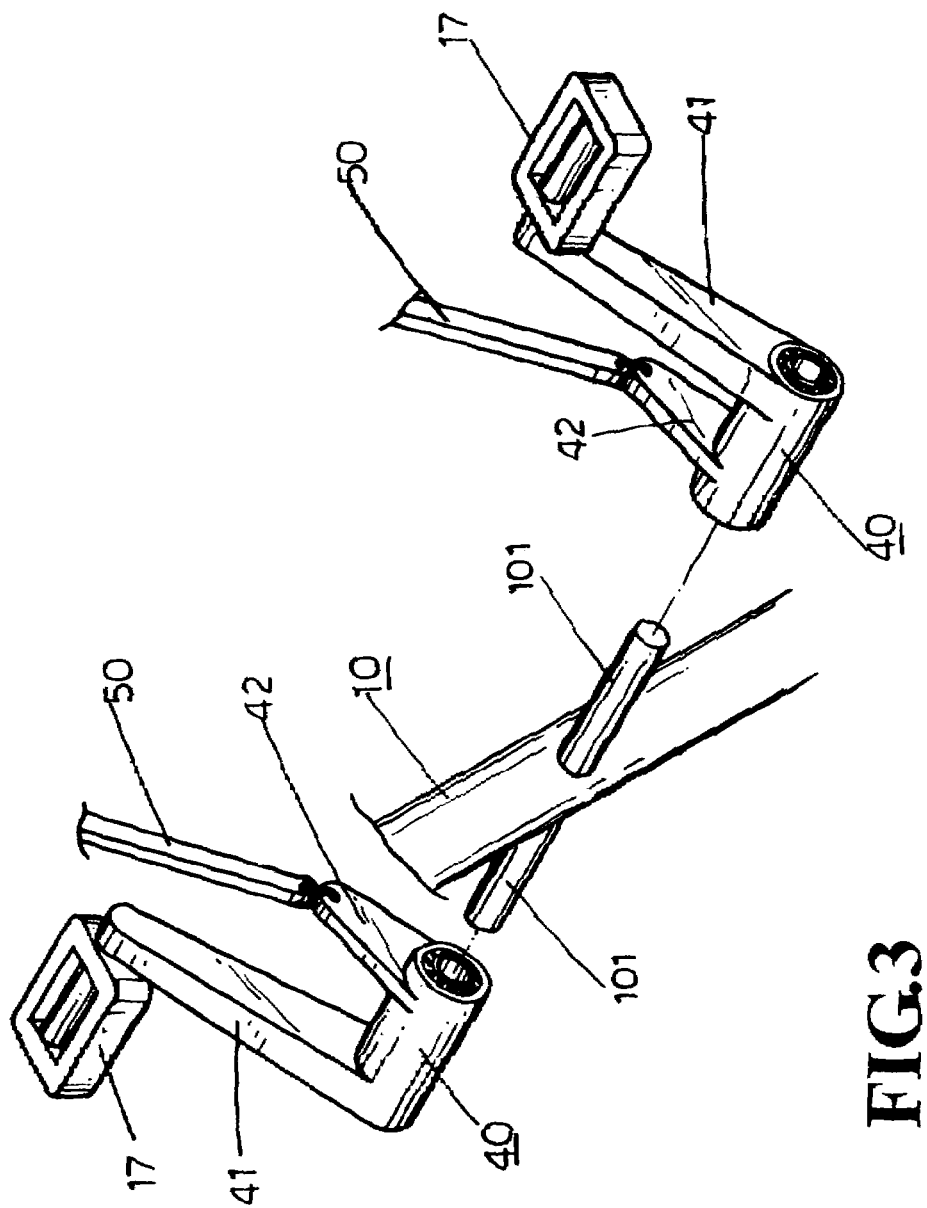
FIG. 3 is a schematic view of a driving body of a preferred embodiment of the present invention.

Referring to FIGS. 1 to 3 for a reciprocal upward and downward pedaling bicycle structure in accordance with the present invention, the structure includes the main structure and components of a regular bicycle such as a frame 10, a front wheel 11, a rear wheel 12, a handle 13, a chain wheel 14, a rear wheel shaft of free wheel 15, a main driving belt 16, and a pedal 17, and is characterized in that at least one main shaft 30 of a free wheel is installed at the position of a chain wheel shaft 20 of the frame 10 (this embodiment of the invention installs left and right main shafts 30 of a free wheel 30), and a free rotating driving body 40 is pivotally coupled to a position corresponding to the frame 10 of the main shaft 30 of a free wheel as shown in FIG. 3. The driving body 40 can be simply a sheath directly and pivotally connected to a positioning axle rod 101 of the frame 10, and a crank 41 and a support rod 42 are disposed on the driving body 40 for installing the pedal 17, and a driving belt 50 is wound at the main shaft 30 of the free wheel 30, and the driving belt 50 has an end connected to the support rod 42 of the driving body 40 and another end connected to the frame 10 through a resilient element 60, and a footrest 70 is installed on both sides of the bottom of the frame 10.

Figure 4:
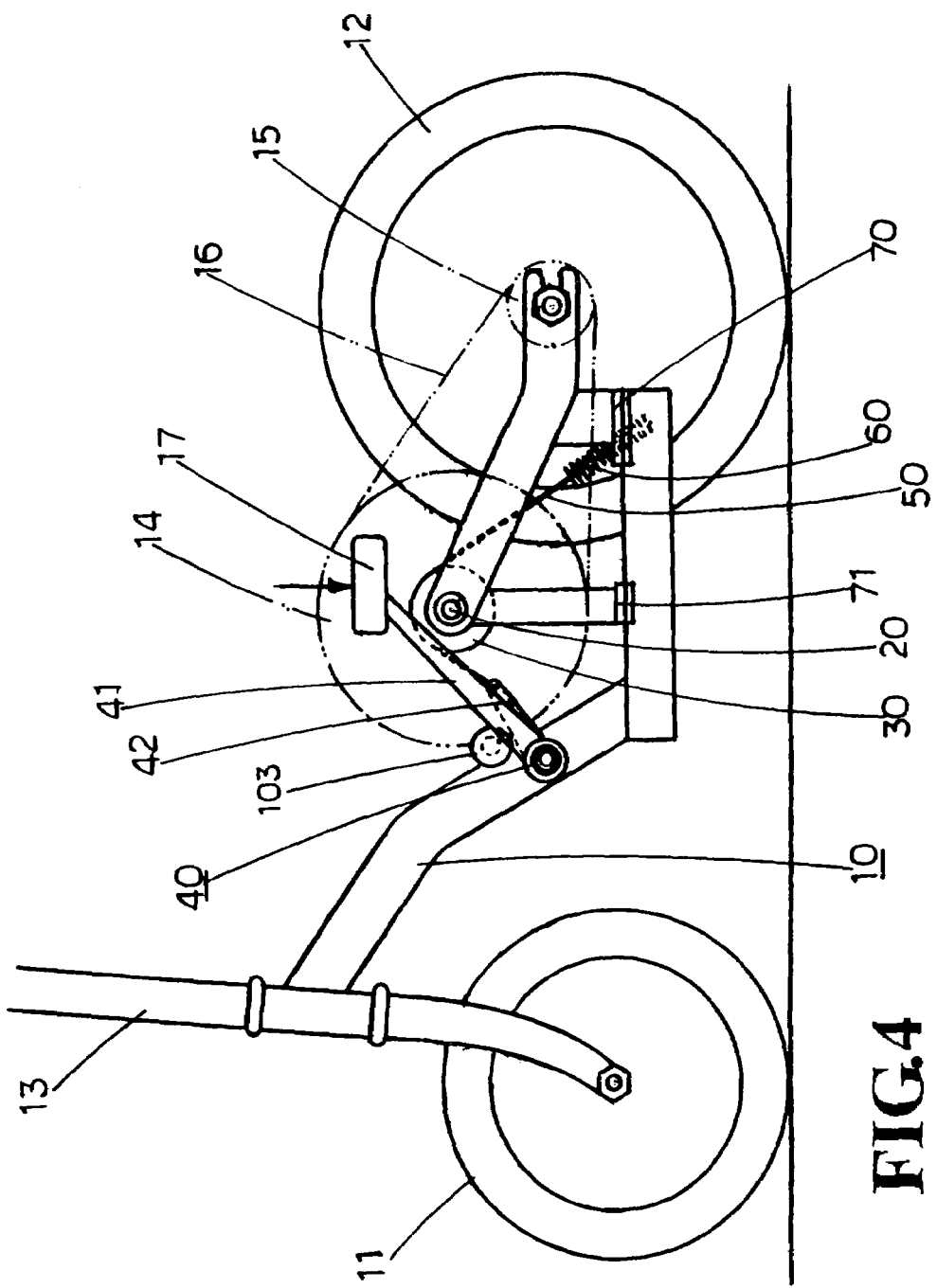
FIG. 4 is a schematic view of a pedal, a crank and an upper section of a support rod set to their respective highest points in accordance with a preferred embodiment of the present invention.
Figure 5:
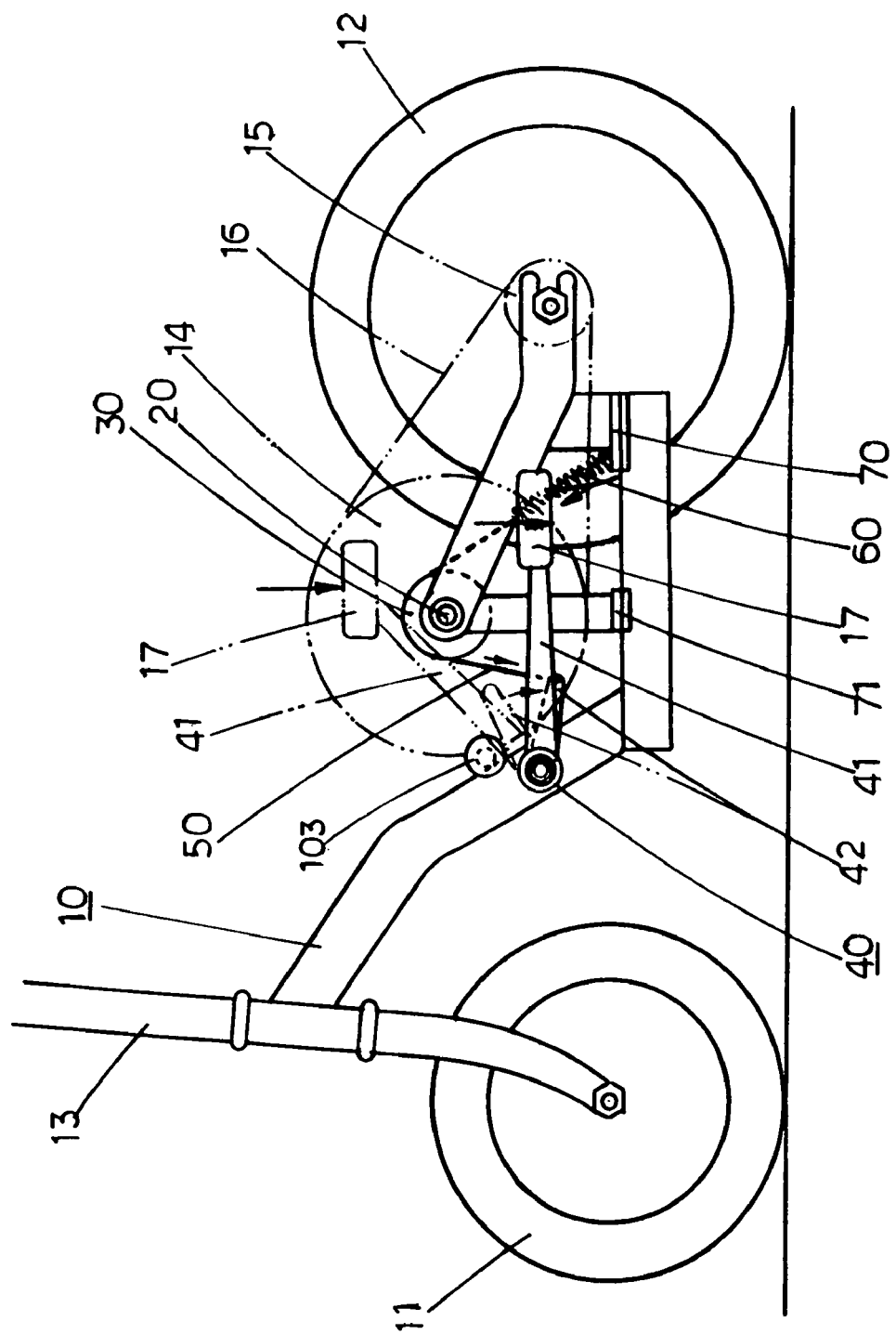
FIG. 5 is a schematic view of stepping a pedal downward in accordance with a preferred embodiment of the present invention.

Referring to FIGS. 4 and 5, an end of the driving belt 50 is wound around the main shaft 30 of the free wheel and another end is dragged to the frame 10 by a resilient element 60, such that the end is connected to the support rod of the driving body 40 and dragged at the frame 10, and the driving body 40 is pivotally coupled for free rotations, and the crank 41 and pedal 17 on the driving body 40 can be acted by the resilient element 60 to provide an upward bounce or swing anytime (as shown in FIG. 4), after the driving belt 50 is wound around the main shaft of the free wheel 30.

Since the main shaft 30 of the free wheel 30 is coaxial with the chain wheel 14, and the chain wheel 14 transmits a driving force to a rear wheel shaft 15 of the free wheel and the rear wheel 12 through the main driving belt 16, such that when the pedal 17 is stepped downward and both crank 41 and support rod 42 are swung downward, the driving belt 50 is pulled downward by the support rod 42 and the main shaft of the free wheel 30, and the chain wheel 14 will be rotated directly, and the rear wheel 12 will be driven to move forward (as shown in FIG. 5). Of course, with the resilience of the resilient element 60, the driving belt 50 will resume its original position by the resilient element 60, if a user lifts the leg that steps on the pedal 17, and then the main shaft 30 of the free wheel 30 will run in an idle manner (wherein the structure and principle of this free wheel are the same as those for a rear wheel shaft of a free wheel of a traditional bicycle). When the chain wheel shaft 20 is not driven to rotate, the support rod 42, crank 41 and pedal 17 are pulled to lift (as shown in FIG. 4) and prepare for the next pedaling movement.

In other words, the foregoing structure is adopted, such that users can step on the pedal 17 to drive the bicycle to move forward, or lift their leg that steps on the pedal 17 to automatically prepare the crank 41 and pedal 17 for the next pedaling movement. With the repeated pedaling operations, a user can step on the pedal 17 up and down to drive the bicycle. The invention not only changes the traditional way of operating a bicycle by a circumferential pedaling to provide a novel and fun way, but also provides a simple and convenient operation and a recreational effect for short-distance transportations, leisure and exercises.

When the structure of the invention is operated, a user steps on a footrest 70 on a side (such as a left side) by a leg (such as a left leg). After the bicycle is driven to move forward, another leg (such as a right leg) steps on the pedal 17 on another side (such as a right side) of the frame 10 directly, such that the crank 41 and the support rod 42 are swung downward, and the bicycle body is driven forward naturally, and then another leg (such as the left leg) continues stepping on the pedal 17 on that side to apply a force downward, and the originally stepped down right leg will be lifted, so that the pedal 17 will resume its original position and prepare for the next pedaling movement. By the reciprocal upward and downward pedaling of the pedal 17, the effect of driving the bicycle forward can be achieved.

Figure 6:
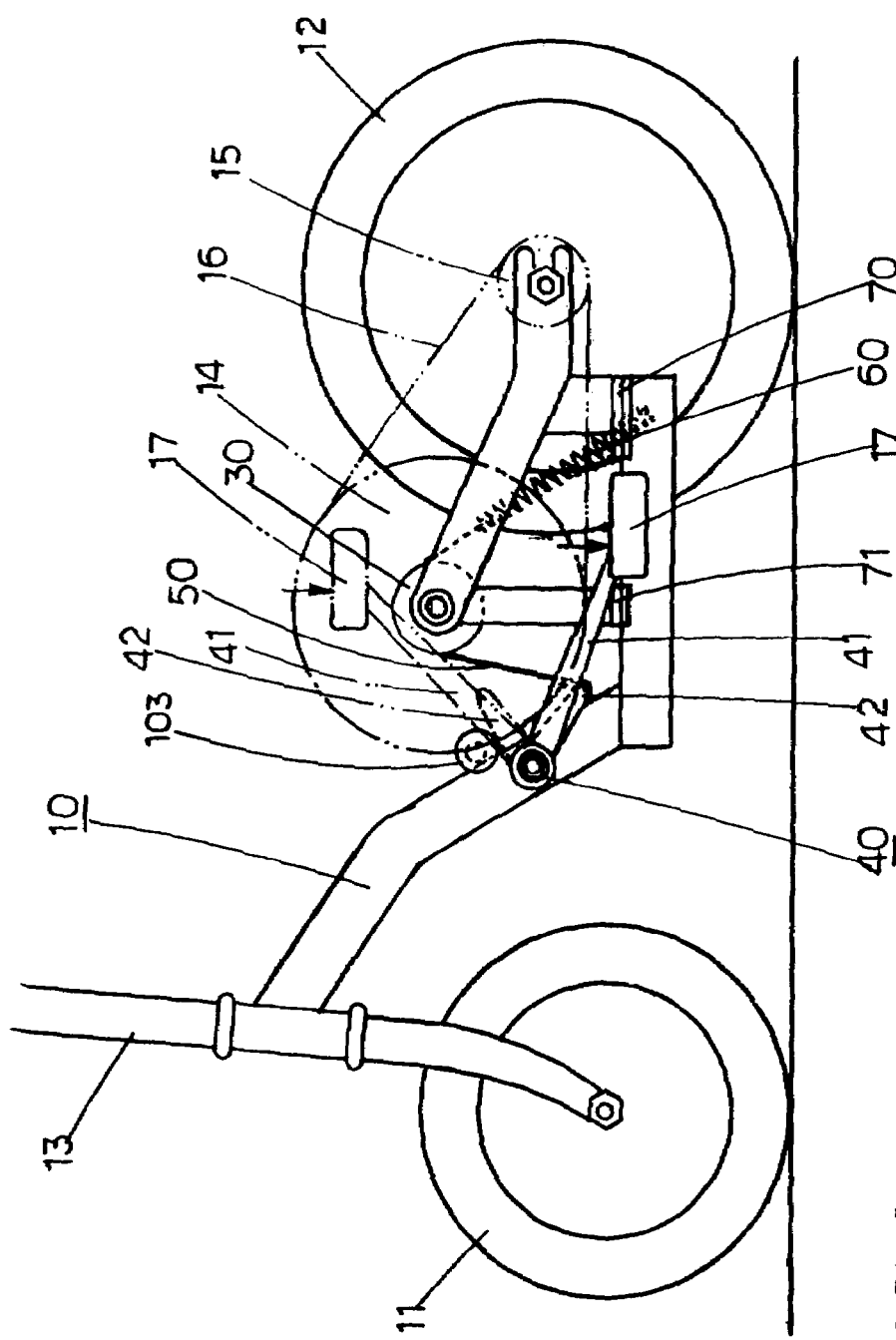
FIG. 6 is a schematic view of a pedal, crank and a lower section of a support rod set to their respective lowest points in accordance with a preferred embodiment of the present invention.

To allow both legs to pedal more smoothly, comfortably and safely, the highest point and lowest point for the pedal 17 to swing upward and downward are restricted appropriately as shown in FIGS. 1 and 6, an upper stopping body 103 corresponding to the support rod 41 is installed at a frame 40 proximate to the top of the driving body, such that when the pedal 17 is swung upward to a predetermined highest point, the upper stopping body 103 can stop the upwardly swung support rod 42. Further, a lower stopping body 71 is installed under the frame 10, such that when the pedal 17 is pedaled downward to a predetermined lowest point, the lower stopping body 71 can stop the downwardly swung crank 41 and prevent the pedal 17 from continuing its downward swing, so as to provide a safe operation.

To meet the operational requirements, the present invention also can install a main shaft 30 of the free wheel on the chain wheel shaft 20, and the corresponding driving body 40, crank 41, support rod 42, pedal 17, driving belt 50, and resilient element 60 to provide a user to pedal the bicycle by one leg at a time. As to users, this kind of pedaling structure and method are substantially the same as described previously and the only difference resides on pedaling the pedal 17 alternately by both legs, so as to provide a smooth, fun and recreating bicycle ride.

In summation of the description above, the reciprocal upward and downward pedaling bicycle structure of the present invention is different from the structure and method for pedaling and driving a bicycle of a prior art. The invention also enhances the fun and recreation of riding a bicycle and complies with the patent application requirements, and thus is duly filed for a patent application.

While the invention has been described by means of specific embodiments, numerous modifications and variations could be made thereto by those skilled in the art without departing from the scope and spirit of the invention set forth in the claims.

What is claimed is:

1. A reciprocal upward and downward pedaling bicycle structure, comprising a frame, a front wheel, a single rear wheel, a handle, a chain wheel, a rear wheel shaft of a free wheel, a main driving belt, and a pair of pedals, characterized in that said structure further comprises:

a footrest, disposed separately on both sides of the bottom of said frame;

a chain wheel shaft, installed at said frame for positioning said chain wheel and having a main shaft of a free wheel respectively corresponding to each of said pedals;

a driving body, pivotally coupled to a position corresponding to said frame for each said main shaft of a free wheel for independent free rotation, and having a crank and a support rod for installing a corresponding one of said pedals; and a driving belt, wound around each said main shaft of a free wheel and having an end installed at said support rod of each said driving body and another end coupled to said frame through a resilient element, such that each said support rod of each said driving body and each said crank can independently provide a lift and an upward swing anytime for each respective pedal; thereby, if a user places a foot to step downward on one of said pedals, said respective support body of said driving body will pull said driving belt and drive said main shaft of a free wheel and said coaxial chain wheel to rotate synchronously, and said chain wheel will drive said rear wheel shaft of a free wheel and said single rear wheel through said main driving belt; and if the user removes the foot from said one pedal, said driving belt will pull said support body of said driving body by a restoring action of said resilient element and an idle rotation of said main shaft of a free wheel to drive said crank and said one pedal to swing upward and prepare for a next pedaling motion.

2. The reciprocal upward and downward pedaling bicycle structure of claim 1, further comprising an upper stopping body corresponding to said support rod of said driving body and disposed proximate to said frame at the top of said driving body to constitute a limitation by the height of said support rod and an upper section of said crank.

3. The reciprocal upward and downward pedaling bicycle structure of claim 1, further comprising a lower stopping body corresponding to said crank or said support rod of said driving body and disposed at the bottom of said frame to constitute a limitation by the position of said support rod and a lower section of said crank.

* * * * *